United States Patent [19]
Berdelle-Hilge

[11] 3,878,301
[45] Apr. 15, 1975

[54] PROCESS FOR CONTROLLING THE PRODUCTIVITY OF MICRO-ORGANISMS

[76] Inventor: Philipp Berdelle-Hilge, 125 High St., Boston, Mass. 02110

[22] Filed: Aug. 21, 1972

[21] Appl. No.: 282,173

Related U.S. Application Data

[63] Continuation-in-part of Ser. No. 173,932, Aug. 23, 1971, Pat. No. 3,737,323, which is a continuation-in-part of Ser. No. 758,019, Sept. 6, 1968, abandoned.

[30] Foreign Application Priority Data

Aug. 23, 1971 Germany............................ 2142228

[52] U.S. Cl. ...................... 426/30; 195/118; 426/29
[51] Int. Cl. ............................................. C12c 11/14
[58] Field of Search ............ 99/31, 50.5, 51, 52, 30, 99/29, 35; 195/111, 115, 116, 118; 426/11, 16, 28, 29, 30

[56] References Cited
UNITED STATES PATENTS

| | | | |
|---|---|---|---|
| 3,173,793 | 3/1965 | Shore et al. | 99/52 |
| 3,737,323 | 6/1973 | Berdelle-Hilge | 99/31 |

*Primary Examiner*—Lionel M. Shapiro
*Assistant Examiner*—R. B. Penland
*Attorney, Agent, or Firm*—Richard P. Crowley

[57] ABSTRACT

A process for controlling the productivity of micro-organisms which are held in at least one reaction bed through which a substrate flows with a short contact time, is characterised in that the desired productivity is obtained by deliberate quantitative and/or qualitative modification of the contact conditions between the substrate and micro-organisms, for example the substrate throughput, the pressure, the relative proportions of the micro-organisms and the substrate or the contents and/or chemical or physical conditions of the substrate.

15 Claims, No Drawings

PROCESS FOR CONTROLLING THE PRODUCTIVITY OF MICRO-ORGANISMS

REFERENCE TO PRIOR APPLICATIONS

This application is a continuation-in-part of U.S. Ser. No. 173,932 filed Aug. 23, 1971 (now U.S. Pat. No. 3,737,323), which application is a continuation-in-part of U.S. Ser. No. 758,019 filed Sept. 6, 1968 (now abandoned).

The invention relates to a process for controlling the productivity of micro-organisms which are held in at least one reaction bed through which substrate flows with a short contact time.

In numerous processes which employ micro-organisms, especially for biological synthesis by means of micro-organisms, the substrate which is utilised or converted by the micro-organisms is supplied continuously or substantially continuously. If the micro-organisms are suspended in a major amount of substrate and if this suspension is agitated, for example stirred, to improve the contact between the micro-organisms and the substrate, a more or less homogeneous mixture of substrate and micro-organisms is obtained in which - after overcoming an induction stage — practically constant physical and chemical conditions become established and the productivity is also at least approximately constant. In continuous processes in which the substrate, for example been wort, is passed in constant flow through several fluidised beds of micro-organisms arranged above one another within a so-called fermentation tower and the substrate undergoes changes in the individual fluidised beds, different conditions occur in the individual separate fluidised beds and these, depending on the particular state of the process, also lead to different reactions in these fluidised beds. In such cases the condition of the micro-organisms, that is to say of the yeast cells in the case of continuous fermentation, is also different in each fluidised bed.

Even greater differences can arise in continuous processes in which the substrate is passed through at least one reaction bed consisting essentially of micro-organisms which are held fixed, in which bed the desired reactions take place with a short contact time.

In the processes of the last-mentioned kind, I have now found that the product issuing from the micro-organism bed undergoes certain fluctuations with respect to its physical and chemical state in the course of time; the fluctuations in its state depend on how specific enzymes or enzyme systems are formed within the micro-organism bed or individual layers of this micro-organism bed, reach their maximum activity, and then decline in activity.

Thus I have established that in the continuous fermentation of beer wort within a yeast layer produced by settlement in front of a filter and rendered permeable by additives, converts the wort supplied to it into a new beer which may, if desired, already be very extensively fermented, the pH of which drops in the first 2 hours to 3.5, rises to 5.5 in the next 3 hours and subsequently settles at a value of about 4. I have now found that such fluctuations in the properties of the biosynthetically produced product can be largely avoided by suitable regulating processes.

According to the present invention, therefore, there is provided a process for controlling the productivity of micro-organisms which are held in a reaction bed through which a substrate flows with a short contact time, in which the desired productivity is obtained by quantitative and/or qualitative modification of the contact conditions between the substrate and the micro-organisms.

Taking fermentation of beer wort as an example, suitable ways of modifying the contact conditions are as follows:

a. The pH can be regulated by changing the through flow rate by varying the supply pressure of the wort. Thus; the variation of the pH can be stabilised within the desired range of pH 4.4 by increasing the pressure by between 0.5 and 2 atmospheres gauge.

b. It is also possible to regulate the pH by supplying new yeast; if the pH rises, the pH curve can be stabilised by adding up to 5% of yeast to the wort.

c. A further method of regulation is to change the temperature of the wort supplied; cooling the wort leads to a reduction of the pH of the product and warming it leads to an increase in the pH; in this, it was observed that a change of + or −5°C leads to a change in pH by an amount of approximately 1.

For example, in a process for the continuous flow fermentation of a wort or of a must in a reaction bed containing yeast, a decrease in the pH of the issuing substrate is balanced by increasing the pressure and the substrate throughput by adding yeast to the substrate and/or by warming the substrate supplied, while an increase in the pH value is suppressed by cooling the substrate supplied.

Considerable differences in the fermentation rate were also found in this type of fermentation over the period of the experiment, but it was possible to balance these by changing the throughput of wort; it was possible to keep the fermentation rate practically constant over long periods of time by changing the wort throughput in a range of 1:10.

Such a change in the throughput also corresponds to a change in the pressure of the wort supplied, which can also lie in the range of 1:10.

In further experiments with rapid fermentation of wort in a yeast layer fixed in front of a filter — with contact times of a few minutes — it was also found that in the first 20 hours of working with a newly settled yeast layer, a relatively high diacetyl value was found in the new beer which issued from the yeast layer; from this it could be concluded that in normal fermentation, diacetyl reductases which degrade the diacetyl substantially more powerfully are only formed within the yeast settlement layer or the yeast cake after a certain induction time. The observation that after a certain longer operating time (24 hours), substantially sufficient degradation of diacetyl occurred in the yeast settlement layer itself led to the finding that the most advantageous productivity could be achieved by using "pre-aged" yeast to form the yeast cake and/or by using aerated wort. It has thus been found that by physical and/or chemical changes in the conditions of the substrate-micro-organisms system, the optimum state of the micro-organisms with regard to the desired productivity, once achieved, can be stabilised.

Such measures enable undesirable fermentation by-products, not only in the case of beer but also in the case of wine, to be sufficiently degraded during the fermentation process itself, that is during passage of the substrate through a relatively thin fixed bed of micro-organisms, so that no after-treatment ot remove such by-products is required.

It is, accordingly, desirable, in a continuous process, first to bring the micro-organisms which are used in the process to the particular physiological state which ensures optimum utilisation of the particular enzyme acitivity in the sense of best productivity, by deliberate control of the conditions mentioned above; these micro-organisms can then be held in a reaction bed through which the substrate is to flow and can be kept therein under the most favourable conditions for preventing enzyme degradation, under optimum working conditions, by providing pH regulation of the substrate, a change in the throughput rate, anaerobic operating conditions and the like, in order, in this way, to inhibit autolysis and degradation of the enzymes by the RNase which is formed.

Some advantageous applications of the process according to the invention, which have already been substantially tested, may additionally be mentioned:

1. The importance of alcohol dehydrogenase for the formation of acetaldehyde is known; its specific activity under normal fermentation conditions is approximately 5 to 6 times greater on the 5th fermentation day than on the 1st fermentation day. Now it is possible to repress alcohol dehydrogenases and malate dehydrogenases by means of glucose. In the production of liquids which are to be treated with alcohol dehydrogenases and malate it is, therefore, preferred to carry out the final fermentation stage in the substantial absence of glucose.

2. Anaerobically cultured yeasts and yeasts which are cultured at a high glucose concentration, have practically no nitochondria and hence little respiratory activity. Since only oxidisable enzymes form aldehydes, a fermentation with minimum aldehyde formation can be achieved by means of a process according to the invention, in which anerobically cultured yeasts are used. Since it is known that acetaldehyde formation is highest at low fermentation rates, acetaldehyde formation can be significantly reduced in a forced through flow fermentation, that is to say by increasing the throughput of substrate.

3. The degradation of malic acid is of particular importance in the maturing of wine. This can be effected, in particular, by lactic acid bacteria and special yeasts, such as schizo-saccharomyces and *Saccharomyces cerevisiae*, in a very short time and with a high degree of effectiveness. The degradation of malic acid or the corresponding decarboxylation can be effected in a bed or a settlement layer of such specifically suitable and pre-treated micro-organisms.

4. Yeasts are known which whilst possessing a poor fermentation capacity, show a considerable acid-forming effect. Such yeasts are preferably used in the production of wine by passing an already substantially fermented wine through a bed of such yeasts which are in a state which causes substantial acid formation.

The application or utilisation of the process according to the invention for controlling the productivity of micro-organisms is not restricted to single-step through flow equipment, in which the substrate to be treated only flows through one or more identical beds of micro-organisms; it is also possible — and herein resides an important advantage of the process according to the invention - to use two or more separate steps in which different controls are effected.

Since the possibilities of internal regulation of the cell are related to the formation of particular end products, the synthesis of special enzymes within the micro-organism ceases if insufficient reactants for the formation of the particular enzyme are available. The speed of the chemical reaction in enzyme synthesis and the speed of diffusion are essentially constant, that is to say an increase in the speed of the chemical reaction also causes an increase in the inflow of material and an increase in enzyme synthesis. In the process according to the invention, particularly the processes in which the substrate flows through a micro-organism reaction bed in a very short time, a very high proportion of the requisite reactants are made available, in intimate contact, to the micro-organisms so that optimum enzyme production is obtained.

Thus a repression of the respiratory types of enzyme can be achieved in glycolytic or anaerobic metabolism, whilst in aerobic metabolism, which is obtainable by appropriate composition of the substrate and adjustment of the remaining reaction conditions, a repression of the glycolytic enzymes and a synthesis of RNase and of the respiratory enzymes is obtainable as a function of the oxidative phosphorylation.

Accordingly it is possible, by using the process according to the invention, to effect a microbial treatment of a substrate in which the anaerobic (glycolytic) or aerobic or respiratory metabolism is started or stopped in a controlled fashion and in a desired time sequence in a bed of micro-organisms or separately in two beds of micro-organisms arranged in series with respect to the flow of the substrate. Thus it is possible, for example, to operate glycolytically in a first step and aerobically in a second step, with different enzyme systems of fundamentally the same or of different groups of micro-organisms; such a separation is not possible in known microbiological synthesis processes. Even with the control provided by the present invention, it is only possible to achieve a partial predominance of one particular reaction over the others by predominance of one or other metabolic enzyme system. It is clear that in such cases, which become possible by application of the process according to the invention, optimum productivity can be achieved by full utilisation of the most favourable activity conditions.

It will be seen from the foregoing that the process according to the invention is applicable to the control of the productivity of micro-organisms in all cases where, as a result of measuring certain properties of the product, regulating measures can immediately be employed which bring about quantitative and/or qualitative changes in the contact conditions between the substrate and the micro-organisms, and as controllable parameters there may be mentioned, inter alia, the substrate throughput, the pressure, the relative proportions of the micro-organisms and the substrate in the reaction bed, changes in the substances present and/or changes in the chemical or physical conditions of the substrate.

Apparatuses for the continuous treatment of liquids with enzyme carriers, such as are described, for example, in German Specifications No. 1,517,814 and 2,000,292, are suitable for carrying out the process according to the invention.

I claim:

1. A process for the continuous and accelerated production of alcoholic beverages comprising the steps of:
   a. continuously passing a fermentable liquid substrate by means of a hydraulic pressure through at least one reaction bed layer consisting essentially of enzyme-producing micro-organisms fixedly settled in front of a filter for retaining said organisms to ferment the liquid substrate in a very short contact time of a few minutes, and to obtain an alcoholic beverage; and
   b. reducing substantially temporarily occurring unintentional variations of the issuing substrates pH and fermentation rate by correspondingly varying at least one of the following parameters: the hydraulic pressure applied to the substrate and temperature of the substrate.

2. A process according to claim 1 which is applied to the continuous flow fermentation of a wort or a must in a reaction layer containing yeast which includes maintaining a constant pH when a temporary decrease in the pH of the issuing substrate occurs by at least one of the two following measures: decreasing the hydraulic pressure and increasing the temperature of the substrate supplied.

3. A process according to claim 1 which is applied to the continuous flow fermentation of a wort or a must in a reaction layer containing yeast which includes maintaining a constant pH when a temporary increase of the pH of the issuing substrate occurs by at least one of the following measures: increasing the hydraulic pressure, decreasing the temperature and adding yeast ot the substrate supplied.

4. A process according to claim 1 which is applied to the continuous flow of fermentation of a wort or must in a reaction layer containing yeast which includes maintaining a constant fermentation rate of the issuing substrate by varying in a range of 1:10 the hydraulic pressure of the substrate supplied.

5. A process according to claim 1 wherein the enzyme-producing micro-organism is yeast, and the liquid substrate is wort or must.

6. A process according to claim 1 wherein the pH of the substrate is maintained at a pH of about 4.4.

7. A process according to claim 6 wherein the hydraulic pressure is varied between about 0.5 to 2 atmospheres guage.

8. A process according to claim 1 wherein the fermenting step is carried out in the absence of glucose.

9. A process according to claim 1 wherein the pH is changed by about 1 by changing the temperature ± 5°C.

10. A process according to claim 1 wherein the substrate is fermented wine and the micro-organism is an acid-forming yeast.

11. A process according to claim 1 wherein the reaction layer comprises at least two beds ranged in series, and the fermenting is carried out in two steps, the first step glycolytically and the second step aerobically.

12. A process according to claim 11 wherein the first and second steps of the fermenting process are carried out with a different enzyme system.

13. A process for the continuous and accelerated production of alcoholic beverages comprising the steps of:
   a. continually passing a fermentable liquid substrate of beer wort by means of hydraulic pressure through at least one reaction bed layer consisting essentially of enzyme-producing micro-organisms comprising yeast, the layer of yeast fixedly settled in front of a filter for retaining the yeast;
   b. fermenting the beer wort in a very short contact time of a few minutes; and
   c. conducting the fermented beer wort through the filter maintaining the pH constant and reducing substantially temporarily occurring unintentional variation of the issuing beer wort's pH fermentation rate by varying the hydraulic pressure of the liquid substrate between about 0.5 and 2 atmospheres gauge, or the temperature of the substrate between about ± 5°C for each change in the pH by 1.

14. A process according to claim 1 wherein a decrease in the pH of the substrate is balanced by increasing the pressure between about 0.5 to 2.0 atmospheres.

15. A process according to claim 1 wherein a decrease in the pH of the substrate is balanced by warming the substrate, and an increase in the pH of the substrate is balanced by cooling the substrate.

* * * * *